US011295762B2

(12) United States Patent
Qian et al.

(10) Patent No.: US 11,295,762 B2
(45) Date of Patent: Apr. 5, 2022

(54) UNSUPERVISED SPEECH DECOMPOSITION

(71) Applicant: INTERNATIONAL BUSINESS MACHINES CORPORATION, Armonk, NY (US)

(72) Inventors: Kaizhi Qian, Champaign, IL (US); Yang Zhang, Cambridge, MA (US); Shiyu Chang, Elmsford, NY (US); Chuang Gan, Cambridge, MA (US); David Cox, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 16/852,617

(22) Filed: Apr. 20, 2020

(65) Prior Publication Data

US 2021/0327460 A1 Oct. 21, 2021

(51) Int. Cl.

*G10L 15/22* (2006.01)
*G10L 15/26* (2006.01)
*G10L 25/90* (2013.01)

(52) U.S. Cl.

CPC .................................... *G10L 25/90* (2013.01)

(58) Field of Classification Search

CPC ......... G10L 19/13; G10L 15/16; G10L 15/00; G10L 25/27; G10L 15/22; G10L 15/26

See application file for complete search history.

(56) References Cited

U.S. PATENT DOCUMENTS

| | | | | |
|---|---|---|---|---|
| 5,793,903 | A * | 8/1998 | Lopresti | G06K 9/00 382/309 |
| 8,880,415 | B1 * | 11/2014 | Eck | G10L 25/27 704/503 |
| 10,204,625 | B2 * | 2/2019 | Mishra | G06K 9/00315 |
| 10,572,447 | B2 * | 2/2020 | Honkala | G06F 16/148 |
| 10,573,313 | B2 | 2/2020 | Mishra et al. | |
| 10,573,336 | B2 * | 2/2020 | Paul | G10L 15/063 |
| 10,706,856 | B1 * | 7/2020 | Korjani | G10L 17/02 |
| 10,735,739 | B2 * | 8/2020 | Mao | H04N 19/463 |
| 10,923,111 | B1 * | 2/2021 | Fan | G10L 15/10 |
| 2004/0013252 | A1 * | 1/2004 | Craner | H04M 1/247 379/142.01 |
| 2006/0235692 | A1 * | 10/2006 | Mukhtar | G10L 19/0018 704/260 |
| 2006/0292531 | A1 * | 12/2006 | Gibson | G09B 7/04 434/236 |
| 2019/0318035 | A1 * | 10/2019 | Blanco | G06F 16/9535 |
| 2020/0027444 | A1 * | 1/2020 | Prabhavalkar | G10L 15/183 |
| 2021/0074308 | A1 * | 3/2021 | Skordilis | G10L 19/09 |

OTHER PUBLICATIONS

Authors, et al., "Transcription of Speech Data With Minimal Manual Effort", IPCOM000028925D, Jun. 8, 2004, pp. 1-8.

(Continued)

*Primary Examiner* — Shreyans A Patel
(74) *Attorney, Agent, or Firm* — Dmitry Paskalov

(57) ABSTRACT

A method, a structure, and a computer system for decomposing speech. The exemplary embodiments may include one or more encoders for generating one or more encodings of a speech input comprising rhythm information, pitch information, timbre information, and content information, and a decoder for decoding the one or more encodings.

20 Claims, 7 Drawing Sheets

(56) References Cited

OTHER PUBLICATIONS

Disclosed Anonymously, "%BLT% a System and Method for Unsupervised Sentence Boundary Detection Using Syntactic Parsers", IPCOM000203888D, Feb. 8, 2011, pp. 1-5.
Disclosed Anonymously, "Method and System for Providing Unsupervised Annotation of Isomorphic (Similar) Patterns to Accelerate Development of Ground Truth for Natural Language Processing Machine Learning Model", IPCOM000257471D, Feb. 15, 2019, pp. 1-2.
Ferris, D.; "Techniques and Challenges in Speech Synthesis", arXiv:1709.07552 cs[SD], Apr. 11, 2016, https://arxiv.org/ftp/arxiv/papers/1709/1709.07552, pp. 1-138.
Guven, E. et al.; "Note and Timbre Classification by Local Features of Spectrogram", Elsevier Procedia Computer Science 12 (2012), www.sciencedirect.com, pp. 182-187.
Mell et al., "The NIST Definition of Cloud Computing", National Institute of Standards and Technology, Special Publication 800-145, Sep. 2011, pp. 1-7.

* cited by examiner

UNSUPERVISED SPEECH DECOMPOSITION

BACKGROUND

The exemplary embodiments relate generally to user speech, and more particularly to decomposing user speech.

Speech information can be roughly decomposed into four components: language content, timbre, pitch, and rhythm. Obtaining disentangled representations of these components is useful in many speech analysis and generation applications.

SUMMARY

The exemplary embodiments disclose a method, a structure, and a computer system for unsupervised speech decomposition. The exemplary embodiments may include one or more encoders for generating one or more encodings of a speech input comprising rhythm information, pitch information, timbre information, and content information, and a decoder for decoding the one or more encodings.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figures 1A, 1B:
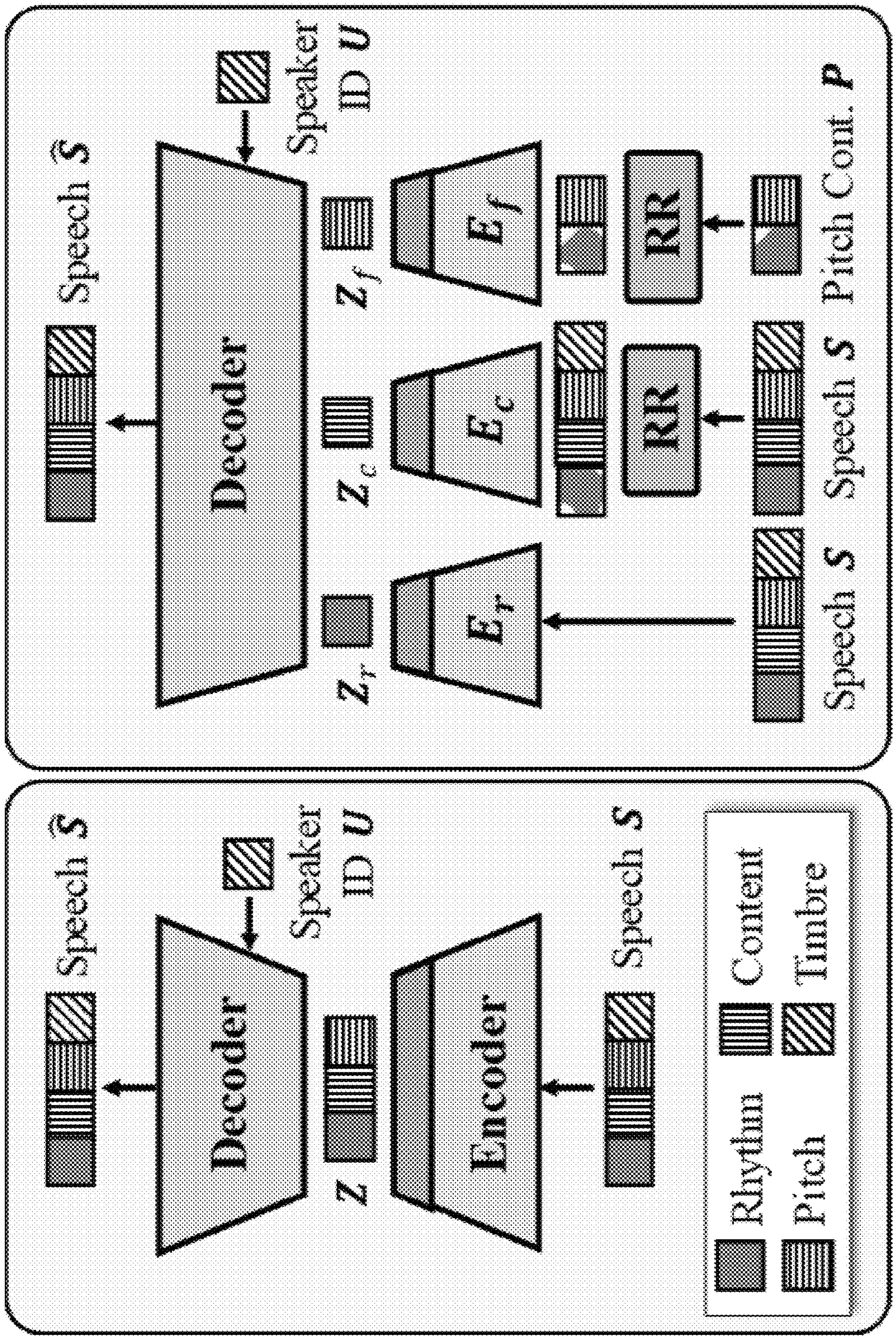
FIG. 1A depicts a traditional method of speech decomposition, in accordance with an embodiment of the present invention.
FIG. 1B depicts an exemplary schematic diagram of a speech decomposition system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Speech information can be roughly decomposed into four components: language content, timbre, pitch, and rhythm. Obtaining disentangled representations of these components is useful in many speech analysis and generation applications. Recently, state-of-the-art voice conversion systems have led to speech representations that can disentangle speaker-dependent and independent information. However, these systems can only disentangle timbre, while information about pitch, rhythm, and content is still mixed together. Further disentangling the remaining speech components is an under-determined problem in the absence of explicit annotations for each component, which are difficult and expensive to obtain.

The present invention addresses the aforementioned problems, and is configured to blindly decompose speech into its four components by introducing three carefully designed information bottlenecks. In doing so, the present invention is among the first that can separately perform style transfer on timbre, pitch, and rhythm without text labels.

Human speech conveys a rich stream of information, which can be roughly decomposed into four important components: content, timbre, pitch, and rhythm. The language content of speech comprises the primary information in speech, which can also be transcribed to text. Timbre carries information about the voice characteristics of a speaker, which is closely connected with the speaker's identity. Pitch and rhythm are the two major components of prosody, which expresses the emotion of the speaker. Pitch variation conveys the aspects of the tone of the speaker, and rhythm characterizes how fast the speaker utters each word or syllable.

For decades, speech researchers have sought to obtain disentangled representations of these speech components, which are useful in many speech applications. In speech analysis tasks, the disentanglement of speech components helps to remove interference introduced by irrelevant components. In speech generation tasks, disentanglement is the foundation of many applications, such as voice conversion, prosody modification, emotional speech synthesis, and low bit-rate speech encoding, to name a few. Recently, state-of-the-art voice conversion systems have been able to obtain a speaker-invariant representation of speech, which disentangles the speaker-dependent information. However, these algorithms are only able to disentangle timbre. The remaining aspects, i.e., content, pitch, and timbre, are still lumped together. As a result, the converted speech produced by these algorithms differs from the source speech only in terms of timbre. The pitch contour and rhythm remain largely the same.

From an information-theoretic perspective, the success in timbre disentanglement can be ascribed to the availability of a speaker identity label, which preserves almost all the information of timbre, such that voice conversion systems can 'subtract' such information from speech. For example, state-of-the-art voice conversion systems may construct an autoencoder for speech and feed the speaker identity label to the decoder. As shown by a traditional method illustrated in FIG. 1A, by constructing an information bottleneck between the encoder and decoder, the system can force the encoder to remove the timbre information because the equivalent information is supplied to the decoder directly. Correspondingly, if there were analogous information-preserving labels for timbre, rhythm, or pitch, the disentanglement of these aspects would be straightforward, simply by utilizing these labels the same way voice conversion algorithms use the speaker identity label. However, obtaining annotations for these other speech components is challenging.

For pitch annotation, although the pitch information can be extracted as pitch contour using pitch extraction algorithms, the pitch contour itself is entangled with rhythm information because it contains the information of how long each speech segment is. For rhythm, it is unclear what constitutes a useful rhythm annotation, not to mention how to obtain it. Finally, language content annotation is at the least well-defined, since it effectively corresponds to text transcriptions. However, these algorithms are language-specific, and obtaining a large number of text transcriptions is expensive, especially for low resourced languages.

Therefore, the present invention focuses on unsupervised methods that do not rely on text transcriptions and instead uses a speech generative model that can blindly decompose speech into content, timbre, pitch, and rhythm, as well as generate speech from these disentangled representations. Thus, the present invention is among the first that enable flexible conversion of different aspects to different styles without relying on any text transcription. To achieve unsupervised decomposition, the present invention introduces an encoder-decoder structure with three encoder channels, each with a different, carefully-crafted information bottleneck design. The information bottleneck is imposed by two mechanisms: first, a constraint on the physical dimension of the representation and, second, the introduction of noise by randomly resampling along the time dimension, both of which have been shown effective. Importantly, the invention demonstrates that subtle differences in the information bottleneck design are able to force different channels to pass different information, such that one passes language content, one passes rhythm, and one passes pitch information, thereby achieving the blind disentanglement of all speech components.

Besides direct value in speech applications, the present invention may also provide insight into a powerful design principle that can be broadly applied to any disentangled representation learning problem: in the presence of an information bottleneck, a neural network will prioritize passing through the information that cannot be provided elsewhere. Thus, this observation inspires a generic approach to disentanglement, and it will be appreciated that concepts of the present invention may be extended and applicable to disentanglement of information outside of speech. Detailed description of the invention follows.

As previously mentioned, speech is composed of rhythm, pitch, timbre, and content, which will be briefly described with respect to FIG. 3A-E. FIG. 3A-E illustrate a spectrogram (left) and pitch contours (right) of single-aspect conversion results of the utterance 'Please call Stella'. The rectangles overlaid on the spectrogram illustrate the formant structures of the phone 'ea' while the arrows mark the frequencies of the second, third, and fourth formants. The rectangles overlaid on the pitch contours illustrate the pitch tones of the word 'Stella'.

Figure 3A:
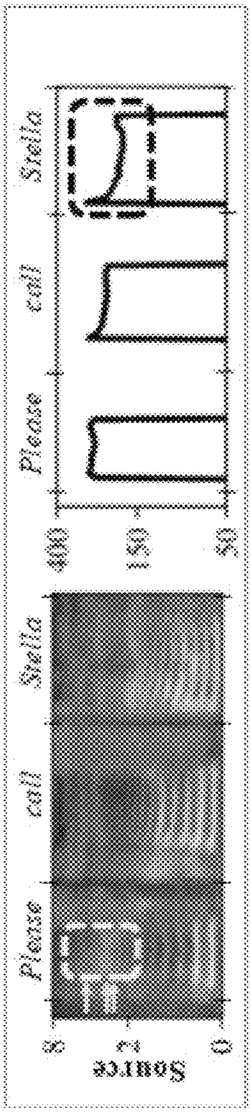
FIG. 3A-E depicts single-aspect conversion results on a speech pair uttering, in accordance with the exemplary embodiments.
Figure 3B:
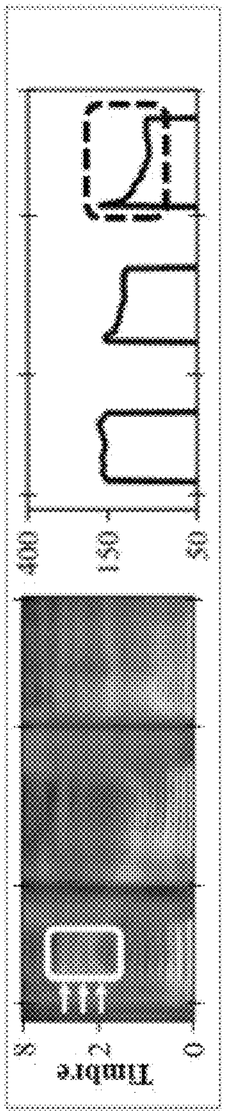

Rhythm characterizes how fast the speaker utters each syllable, which is reflected by how the spectrum is unrolled along the horizontal axis, i.e. the time axis. In FIG. 3A, the spectrum is spread along the time axis, indicating a slow speaker, while in FIG. 3E the spectrum is compact along the time axis, indicating a fast speaker. The syllable alignment marked below the time axis also shows such correspondence.

Figure 3C:
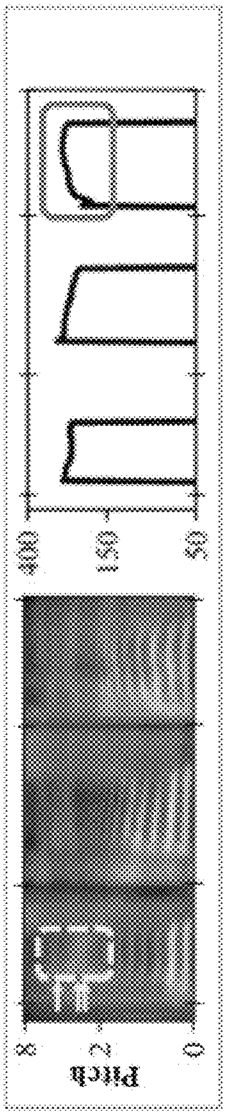
Figure 3D:
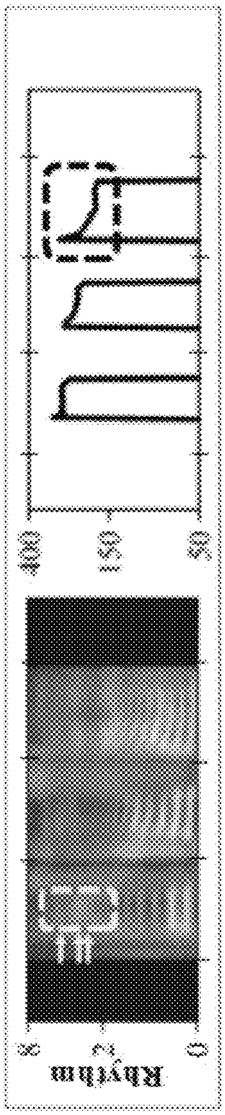
Figure 3E:
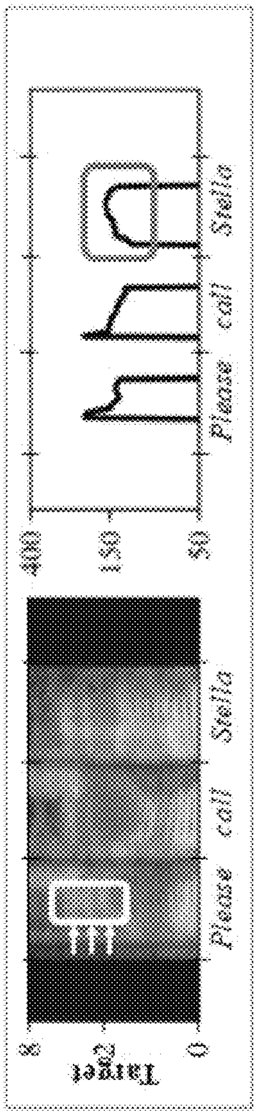

The pitch contour conveys three key kinds of information. First, the pitch range reflects speaker identity information. As shown in FIG. 3A, the top pitch contour is all above 150 Hz, which is common in many female voices, while the pitch contour in FIG. 3E is all below 150 Hz, which is common in many male voices. Second, pitch contour contains rhythm information, because each nonzero segment of the pitch contour represents a voiced segment, which typically corresponds to a word or a syllable. Finally, the pitch contour reflects the pitch targets, e.g., rise or fall, high or low, etc., of each syllable, which expresses the speaker's intonation. In FIGS. 3A-E, the solid and dotted line square marks overlaid on the pitch contours (right) highlight the pitch target of the last word, i.e., "stella". In the pitch contour of FIG. 3A, the tone is falling, while in the pitch contour of FIG. 3E, the tone is rising. Notably, and as used herein, "pitch" refers to pitch target information, which is different from the pitch contour described above.

Timbre is perceived as the voice characteristics of a speaker. It is reflected by the frequency distribution of formants, which are the resonant frequency components in the vocal tract. In a spectrogram, the formants are shown as the salient frequency components of the spectral envelope. In FIG. 3A-E, the rectangles and arrows overlaid on the spectrogram highlight three formants. As can be seen, the spectrogram of FIG. 3A has a higher formant frequency range, indicating a bright voice, while the spectrogram of FIG. 3E has a lower formant frequency range, indicating a deep voice.

In English and many other languages, the basic unit of content is phone. Each phone comes with a particular formant pattern. For example, the three formants outlined by a dotted line in FIG. 3A and FIG. 3C-D are the second, third, and fourth lowest formants of the phone 'ea' as in 'please'. Although their formant frequencies have different ranges, which indicates their difference in timbre, they have the same pattern in that they tend to cluster together and are far away from the lowest formant (which is at around 100 Hz).

Turning now to FIG. 1, FIG. 1A depicts a traditional method to decompose components of speech while FIG. 1B depicts the herein described improved method of speech decomposition implemented by the speech decomposition system 100, in accordance with exemplary embodiments. FIG. 1A is illustrated herein merely for the purpose of illustrating the limitations of traditional speech decomposition methods and improvements of the presently introduced speech decomposition system 100 thereon.

In presenting the forthcoming problem statement and for notation purposes, let uppercased letters X and X denote random scalars and vectors respectively, lower-cased letters x and x denote deterministic scalars and vectors respectively, H(X) denote the Shannon entropy of X, H(Y|X) denote the entropy of Y conditional on X, and I(Y; X) denote mutual information. Denote $S=\{S_t\}$ as a speech spectrogram (e.g., FIG. 3), where t is the time index, and denote the speaker's identity as U. Here, the speech decomposition system 100 is configured to assume that S and U are generated through the following random generative processes:

$$S=g_s(C,R,F,V),U=g_u(V) \quad \text{Eq. (1)}$$

where C denotes content; R denotes rhythm; F denotes pitch target; V denotes timbre. Here, the speech decomposition system 100 assumes $g_s(\bullet)$ and $g_u(\bullet)$ are a one-to-one mapping. Also note that here it is assumed that C also accounts for the residual information that is not included in rhythm, pitch, or timbre.

The present invention (FIG. 1B) comprises an autoencoder-based generative model for speech such that the hidden code contains disentangled representations of the speech components. Formally, the representations are denoted as $Z_c$, $Z_r$ and $Z_F$, and these representations should satisfy:

$$Z_c=h_c(C),Z_r=h_r(R),Z_f=h_f(F), \quad \text{Eq. (2)}$$

where $h_c(\bullet)$, $h_r(\bullet)$, and $h_f(\bullet)$ are all one-to-one mappings.

FIG. 1A shows the framework of a traditional method for decomposing speech that is improved upon by the speech decomposition system 100 described herein. The traditional method for decomposing speech illustrated by FIG. 1A comprises an encoder and a decoder with the encoder having an information bottleneck at the narrow end (shown as a shaded tip), which is implemented as hard constraint on code dimensions. The input to the encoder is speech spectrogram S, and the output of the encoder is the speech code, denoted as Z. The decoder takes Z and the speaker identity label U as its inputs, and produces a speech spectrogram $\hat{S}$ as output. Formally, the encoder is denoted as E(•), and the decoder as D(•, •). The pipeline for the traditional method of decomposing speech illustrated by FIG. 1 can be expressed as:

$$Z=E(S),\hat{S}=D(Z,U). \quad \text{Eq. (3)}$$

During training, the output of the decoder attempts to reconstruct the input spectrogram:

$$\frac{\min}{\theta}\sum\left[\|\hat{s}-s\|_2^2\right], \quad \text{Eq. (4)}$$

where θ denotes all the trainable parameters. It can be shown that if the information bottleneck is tuned to the right size, this simple scheme implemented by traditional methods can achieve disentanglement of the timbre information as:

$$Z=h(C,R,F), \quad \text{Eq. (5)}$$

FIG. 1A provides an explanation of why this is possible. Speech is represented as a concatenation of cross hatched blocks, indicating the content, rhythm, pitch, and timbre information (see legend). Note that speaker identity is represented with the same block cross hatching as timbre because it is assumed to preserve equivalent information to timbre according to Eq. (1). Since the speaker identity is separately fed to the decoder, the decoder still has access to all the information in order to perform self-reconstruction even if the encoder does not preserve the timbre information in its output. Therefore, when the information bottleneck is binding, the encoder will remove the timbre information. However, Z still lumps content, rhythm, and pitch together. As a result, this traditional speech decomposition technique is only capable of converting timbre.

FIG. 1B illustrates the framework of the speech decomposing system 100 that improves upon the traditional method illustrated and discussed above. As in the traditional method, the speech decomposing system 100 comprises an autoencoder with an information bottleneck. However, in order to further decompose the remaining speech components, the speech decomposing system 100 introduces three encoders with heterogeneous information bottlenecks, namely a content encoder ($E_c$), a rhythm encoder ($E_r$), and a pitch encoder ($E_f$).

The Encoders: As shown in FIG. 1B, all three encoders $E_c$, $E_r$, and $E_f$ are similar but with two subtle differences. First, the input to the content encoder $E_c$ and rhythm encoder $E_r$ is speech S, whereas the input to the pitch encoder is the pitch contour, which we denote as P. As previously mentioned, the pitch contour P is not equivalent to the pitch information F. Rather, the speech decomposing system 100 normalizes the pitch contour P to have the same mean and variance across all the speakers such that the pitch contour only contains pitch and rhythm information. Second, the content encoder $E_c$ and pitch encoder $E_f$ perform a random resampling operation along the time dimension t of the input. Random resampling involves two steps of operations. The first step is to divide the input into segments of random lengths, and the second is to randomly stretch or squeeze each segment along the time dimension t. Therefore, random resampling can be regarded as an information bottleneck on the speech component rhythm.

All the encoders $E_c$, $E_r$, and $E_f$ have a physical information bottleneck at the output. The final outputs of the encoders are called content code, rhythm code, and pitch code, denoted as $Z_c$, $Z_r$ and $Z_f$, respectively. Formally, the encoders are denoted as $E_c(\bullet)$, $E_r(\bullet)$ and $E_f(\bullet)$, and the random resampling operation is denoted as as A(•), which results in:

$$Z_c=E_c(A(S)),Z_r=E_r(S),Z_f=E_f(A(P)), \quad \text{Eq. (6)}$$

The Decoder: The decoder takes all the speech code and the speaker identity label (or embedding) as its inputs, and produce a speech spectrogram as output, i.e.:

$$\hat{S}=D(Z_c,Z_r,Z_f,U). \quad \text{Eq. (7)}$$

During training, the output of the decoder attempts to reconstruct the input spectrogram, which is the same as in Eq. (4). Importantly, when all the information bottlenecks are appropriately set and the network representation power is sufficient, a minimizer of Eq. (4) will satisfy the disentanglement condition as in equation (2), as will be described in greater detail forthcoming.

FIG. 1B provides an illustration of how the speech decomposition system 100 achieves decomposition of all four speech components, where a few important assumptions are made.

Assumption 1: The random resampling operation will contaminate the rhythm information R, i.e. $\forall r_1 \neq r_2$:

$$P_r[A(g_s(C,r_1,F,V))=A(g_s(C,r_2,F,V))]>0, \quad \text{Eq. (8)}$$

Assumption 2: The random resampling operation will not contaminate the other speech components, i.e.:

$$I(C;A(S))=H(C),I(F;A(S))=H(F), \quad \text{Eq. (9)}$$

Assumption 3: The pitch contour P contains all the pitch information and a portion of rhythm information:

$$P=g_p(F,R),I(F;P)=H(F), \quad \text{Eq. (10)}$$

As shown in FIG. 1, speech is illustrated as four cross hatched blocks of information of rhythm, pitch, content, and timbre. With reference to FIG. 1B, when speech passes through the random resampling operation RR of the content encoder $E_c$, a random portion of the rhythm block is wiped in the output (shown by a lack of cross hatching in corners of the rhythm block), but the other speech blocks of pitch, content, and timbre remain unchanged. In addition, the pitch contour P contains only two blocks, namely the pitch block and the rhythm block. Here, the rhythm block is similarly wiped because the pitch contour P does not contain all the rhythm information, and it misses even more when it passes through the random resampling module RR. As in the traditional manner of speech decomposition illustrated by FIG. 1A, the timbre information is directly fed to the decoder such that all the encoders do not need to encoder the timbre information. The following explains how the speech decomposition system 100 can force the encoders to separately encode the content, pitch, and timbre in a manner not possible using the traditional method.

First, as illustrated by FIG. 1B, the rhythm encoder $E_r(\bullet)$ is the only encoder that has access to the complete rhythm information R because, as noted earlier, portions of the rhythm component are wiped by the resampling operations RR (illustrated in FIG. 1B by the portions of missing rhythm cross hatching in the RR outputs). The other two encoders $E_c(\bullet)$ and $E_f(\bullet)$ only preserve a random portion of R, and there is no way for $E_r(\bullet)$ to guess which part is lost and thus only supply the lost part. Instead, $E_r(\bullet)$ must pass all the rhythm information. Meanwhile, the other aspects are available in the other two encoders $E_c(\bullet)$ and $E_f(\bullet)$. Therefore, if $E_r(\bullet)$ is forced to lose some information by its information bottleneck, it will prioritize removing the content, pitch, and timbre.

Second, given that $E_r(\bullet)$ only encodes R, then the content encoder $E_c(\bullet)$ becomes the only encoder that can encode all the content information C because the pitch encoder does not have access to C. Therefore, $E_c(\bullet)$ must pass all the content information. Meanwhile, the other aspects can be supplied elsewhere so the rhythm encoder will remove the other aspects if the information bottleneck is binding.

Finally, with $E_r(\bullet)$ encoding only R and $E_c(\bullet)$ encoding only C, the pitch encoder $E_f(\bullet)$ must encode of the pitch information. All the other aspects are supplied in other channels, so $E_f(\bullet)$ will prioritize removing these aspects if the information bottleneck is binding. Simply put, if each encoder is only allowed to pass one block, then the arrangement shown in FIG. 1B is the only way to ensure full recovery of the speech information.

The results of the aforementioned implementation is presented below.

Theorem 1: assume C, R, F, U are independent, and that the information bottleneck is precisely set such that:

$$H(Z_c)=H(C),H(Z_r)=H(R),H(Z_f)=H(F), \quad \text{Eq. (11)}$$

Assume Eq. (1), (8), (9) and (10) hold. Then the global optimum of equation (4) would produce the disentangled representation as in (2) (the proof of such is omitted for brevity). Although Theorem 1 is contingent on a set of relatively stringent conditions, which may not hold in practice, the speech decomposition system 100 can empirically verify disentanglement capabilities.

Figure 2:
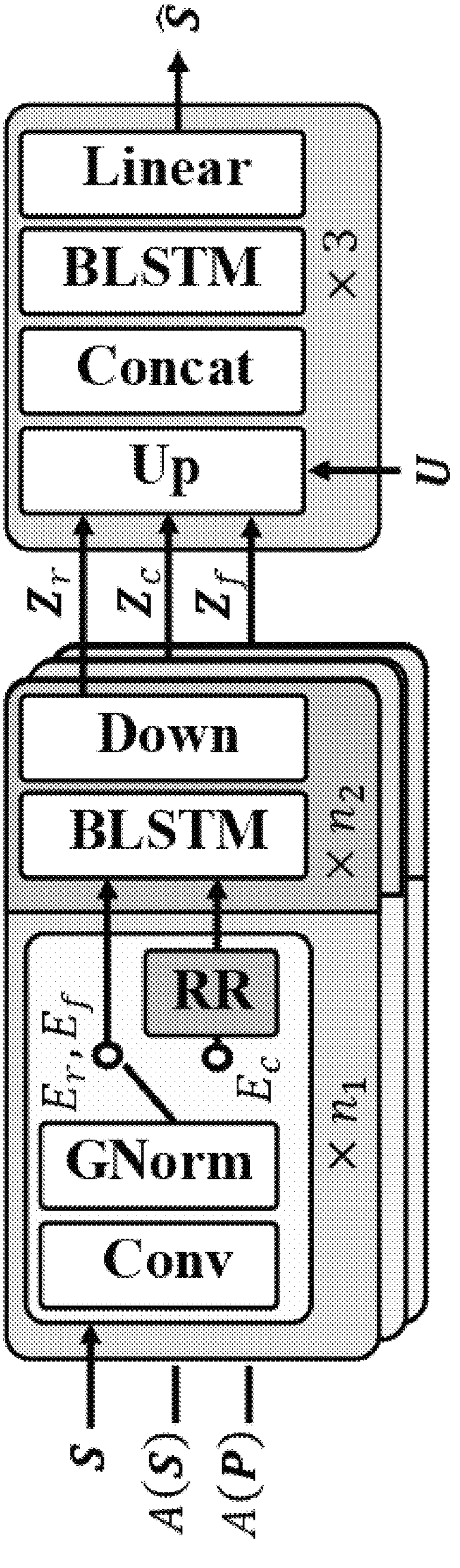
FIG. 2 depicts an architecture of the speech decomposition system 100, in accordance with the exemplary embodiments.

With reference now to FIG. 2, the architecture of the speech decomposition system 100 is illustrated. It should be noted that FIG. 2 and Table 1 illustrate only one possible architecture and hyperparameter setting of the present invention, and other architectures may be implemented to achieve a similar result. In FIG. 2, GNorm denotes group normalization, RR denotes random resampling, Down and Up denote downsampling and upsampling operations, respectively, Linear denotes linear projection later, and ×n denotes that the module is repeated n times. The left module corresponds to the three encoders $E_c$, $E_r$, and $E_f$ and the right to the decoder. All three encoders share a similar architecture, namely a stack of 5×1 convolutional layers followed by group normalization. For the content encoder $E_c$, the output of each convolutional layer is passed to a random resampling module RR to further contaminate rhythm. The final output of the convolutional layers is fed to a stack of bidirectional-LSTM layers to reduce the feature dimension, and then pass through a downsampling operation to reduce the temporal dimension, producing the hidden representations. Table 1 shows the hyperparameter settings of each encoder:

TABLE 1

Hyperparameter settings of the encoders.

| | Rhythm | Content | Pitch |
|---|---|---|---|
| Conv Layers | 1 | 3 | 3 |
| Conv Dim | 128 | 512 | 256 |
| Norm Groups | 8 | 32 | 16 |
| BLSTM Layers | 1 | 2 | 1 |
| BLSTM Dim | 1 | 16 | 32 |
| Downsample Factor | 16 | 8 | 8 |

The decoder first upsamples the hidden representation to restore the original sampling rate. The speaker identity label U, which is a one-hot vector, is also repeated along the time dimension to match the temporal dimension of the other upsampled representations. All the representations are then concatenated along the channel dimension and fed to a stack of three bidirectional-LSTM layers with an output linear layer to produce the final output. The spectrogram is then converted back to the speech waveform using a neural network.

FIG. 3A-E shows the single-aspect conversion results on a speech pair uttering ‘Please call Stella’. The frequency axis units of all the spectrograms are in kHz, and those of the pitch contour plots are in Hz. The experiments are performed on speech corpora. The training set contains 20 speakers where each speaker has roughly 15 minutes of speech with different utterances, i.e., the conventional voice conversion setting. The speech decomposition system 100 is trained using a neural network optimizer with a batch size of 16 for 800 k steps. Since there are no other algorithms that can perform blind decomposition so far, we will be comparing our result with a conventional voice conversion baseline. The model selection is performed on the training dataset. Specifically, the physical bottleneck dimensions are tuned based on the criterion that when the input to one of the encoders or the speaker embedding is set to zero, the output reconstruction error should increase by at least 10%. Indeed, setting the inputs and speaker embedding to zero can measure the degree of disentanglement. From the models that satisfy this criterion, the speech decomposition system 100 is configured to select a model with the lowest training error.

Theoretically, if the speech decomposition system 100 can decompose the speech into different components, then it should be able to separately perform style transfer on each aspect, which is achieved by replacing the input to the respective encoder with that of the target utterance. For example, to convert pitch, the speech decomposition system 100 feeds the target pitch contour to the pitch encoder. To convert timbre, the speech decomposition system 100 feeds the target speaker id to the decoder. The speech decomposition system 100 is configured to construct parallel speech pairs from the test set, where both the source and target speakers read the same utterances (note that the speech decomposition system 100 uses the parallel pairs only for testing and that, during training, the speech decomposition system 100 is trained without parallel speech data). For each parallel pair, the speech decomposition system 100 is configured to set one utterance as the source and one as the target, and perform seven different types of conversions, including three single-aspect conversions (rhythm-only, pitch-only, and timbre-only), three double-aspect conversions (rhythm+pitch, rhythm+timbre, and pitch+timbre), and one all-aspect conversion.

In FIG. 3A-E, the source speaker is a slow speaking female and the target speaker is a fast speaking male. As illustrated by FIG. 3A-E, the speech decomposition system 100 can separately convert each aspect. First, in terms of rhythm, note that the rhythm-only conversion is perfectly aligned with the target utterance in time, whereas the timbre-only and pitch-only conversions are perfectly aligned with the source utterance in time. Second, in terms of pitch, note that the timbre-only and rhythm-only conversions have a falling tone on the word 'Stella', which is the same as the source utterance, as highlighted by the overlaid dashed rectangle. The pitch-only conversion has a rising tone on 'Stella', which is the same as the target utterance, as highlighted by the solid overlaid rectangles. Third, in terms of timbre, as highlighted by the rectangles overlaid on the spectrograms, the formants of pitch-only and rhythm-only conversions are as high as those of the source speech, and the formants of timbre-only conversions are as high as those in the target.

Figure 4:
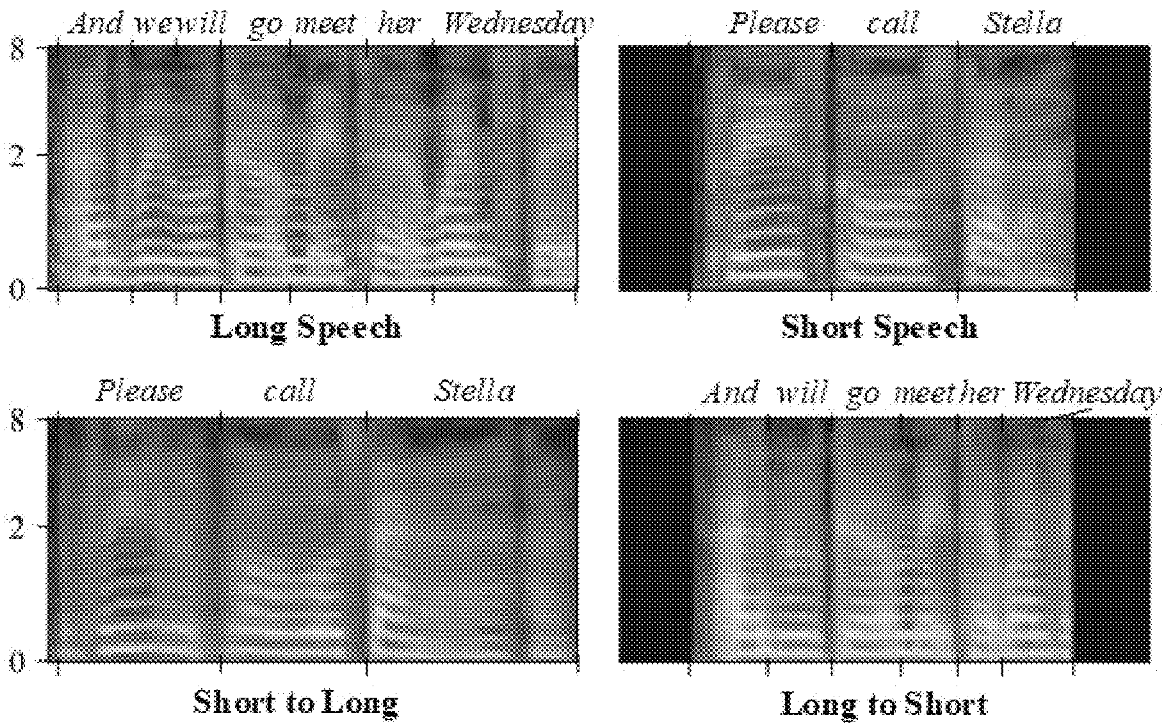
FIG. 4 depicts a rhythm-only conversion between a long and a short utterance, in accordance with the exemplary embodiments.

Since utterances with mismatched contents have different numbers of syllables and lengths, the speech decomposition system 100 must be tested to convert rhythm when the source and target utterances read different content. FIG. 4 illustrates the rhythm-only conversion between a long utterance, 'And we will go meet her Wednesday' (top left panel), and a short utterance, 'Please call Stella' (top right panel). The short to long conversion is shown in the bottom left panel. It can be observed that the speech decomposition systems 100 attempts to match the syllable structure of the long utterance by stretching limited words. In particular, 'please' is stretched to cover 'and we will', 'call' to cover 'go meet', and 'Stella' to cover 'her Wednesday'. Conversely, in the long to short conversion (bottom right panel), the speech decomposition system 100 attempts to squeeze everything to the limited syllable slots in the short utterance. Intriguingly still, the word mapping between the long utterance and the short utterance is exactly the same as in the short to long conversion. In both cases, the word boundaries between the converted speech and the target speech are surprisingly aligned. These observations suggest that the speech decomposition system 100 implements an intricate 'fill in the blank' mechanism when combining the rhythm information with content and pitch. Restated, the rhythm code provides a number of blanks, and the decoder fills the blanks with the content information and pitch information provided by the respective encoders. Furthermore, an anchoring mechanism is observed that associates the content and pitch with the right blank, which functions stably even if the blanks and the content are mismatched.

Figure 5:
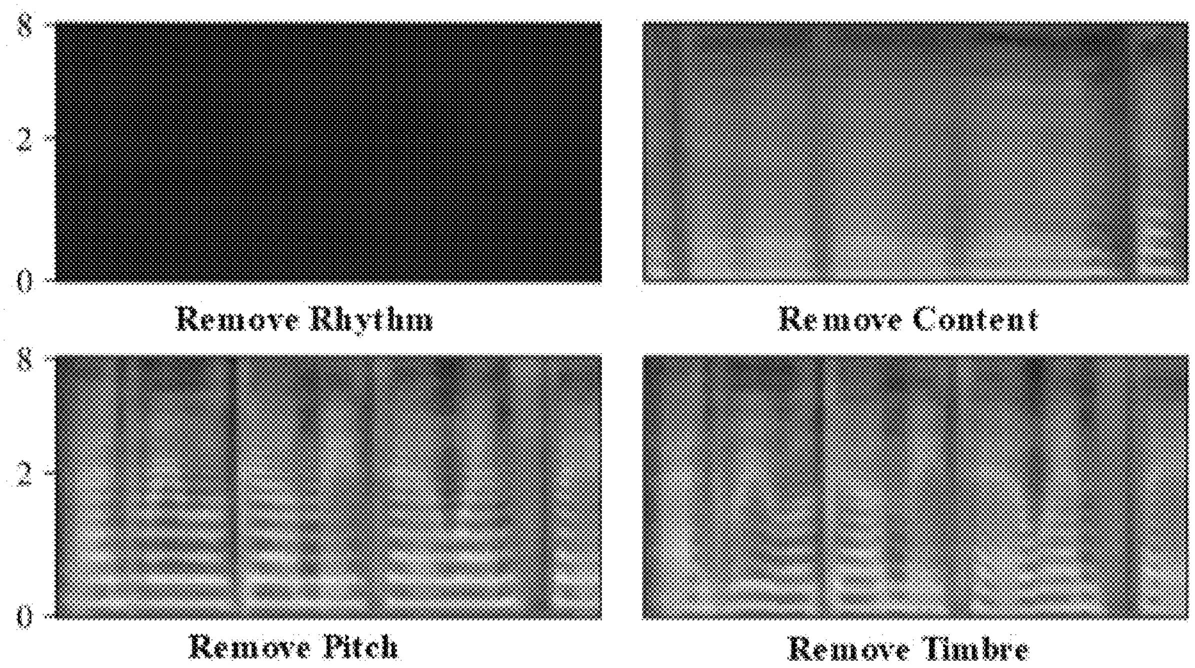
FIG. 5 depicts four spectrograms, each with one of the four speech components removed, in accordance with the exemplary embodiments.

To further understand the disentanglement mechanism of the speech decomposition system 100, FIG. 5 illustrates four spectrograms, each with one of the four speech components removed. To remove rhythm, content or pitch, the speech decomposition system 100 is configured to set the input to the rhythm encoder, content encoder, or pitch encoder to zero. To remove timbre, the speech decomposition system 100 is configured to set the speaker embedding to zero. As can be observed in FIG. 5, when the rhythm is removed (top left), the output becomes zero, and when the content is removed (top right), the output becomes a set of slots with no informative spectral shape. These findings are consistent with the 'fill in the blank' implementation of the speech decomposition system 100 observed above. When rhythm code is removed, there is no slot to fill, and hence the output spectrogram is blank. When content is removed, there is nothing to fill in the blanks, resulting in a spectrogram with uninformative blanks. When the pitch is removed (bottom left), the pitch of the output becomes completely flat, as can be seen from the flat harmonics. Finally, when timbre is removed (bottom right), the formant positions of the output spectrogram shift, which indicates that the timbre has changed, possibly to an average speaker.

In order to verify the above, the speech decomposition system 100 is configured to vary the information bottleneck and determine whether the speech decomposition system 100 performs as expected. According to FIG. 1, if the physical information bottleneck of the rhythm encoder is too wide, then the rhythm encoder will pass all the information through, and the content encoder, pitch encoder, and speaker identity will be useless. As a result, rhythm-only conversion will convert all the aspects. On the other hand, the pitch-only and timbre-only conversions will alter nothing. Similarly, if the physical information bottleneck of the content encoder is too wide, but random sampling is still present, then the content encoder will pass almost all the information through, except for the rhythm information, because the random resampling operations still contaminate the rhythm information and the speech decomposition system 100 would still rely on the rhythm encoder to recover the rhythm information. As a result, the rhythm-only conversion would still convert rhythm, but the pitch-only and timbre-only conversions would barely alter anything. The results show that when the rhythm encoder physical bottleneck is too wide, the rhythm-only conversion converts all the aspects, while other conversions convert nothing. In addition, when the content encoder physical bottleneck is too wide, the rhythm-only conversion still converts rhythm. Notably, the timbre-only conversion still converts timbre to some degree, possibly due to the random resampling operation of the content encoder.

Figure 6:
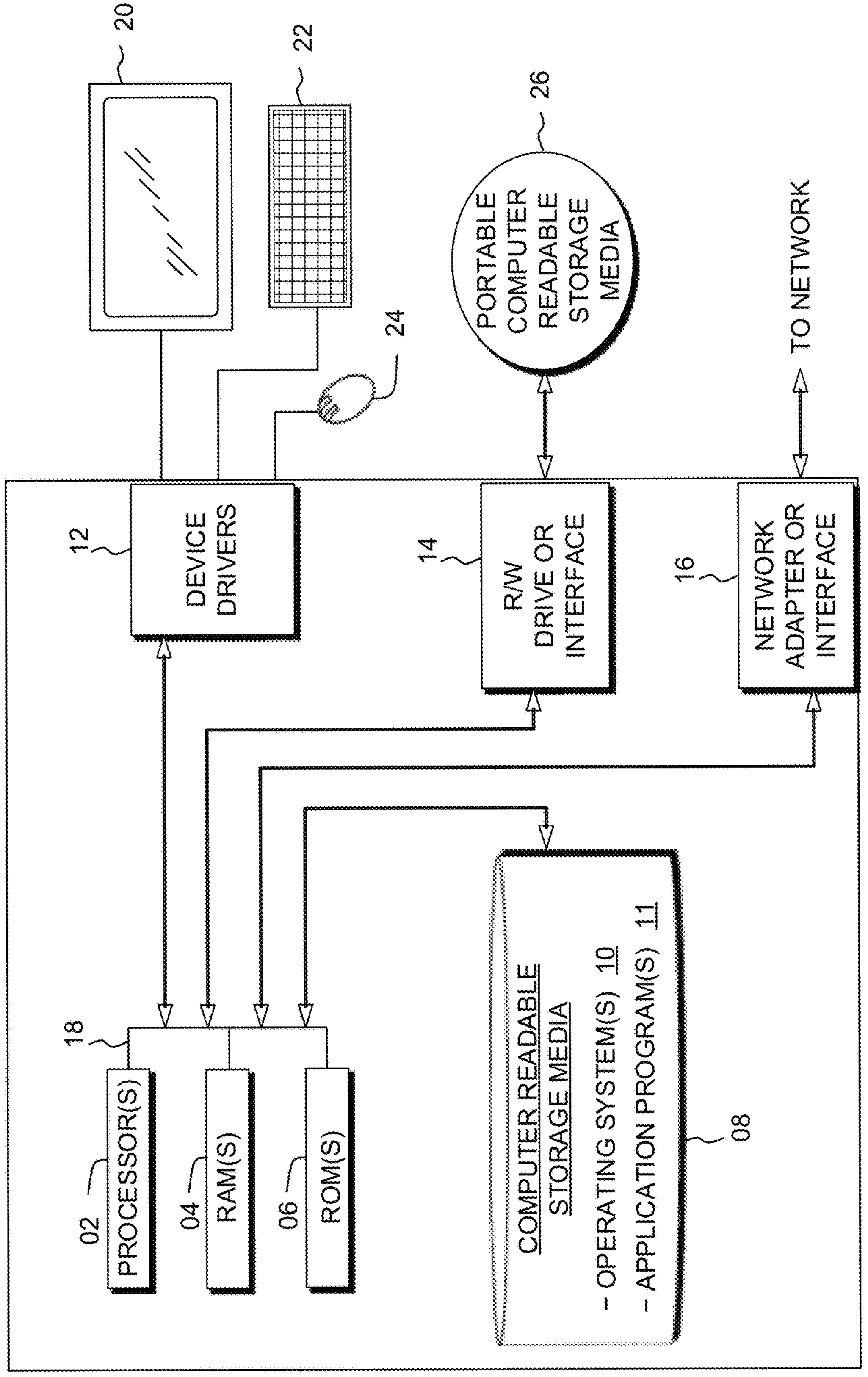
FIG. 6 depicts an exemplary block diagram depicting the hardware components of the mobility assessment system 100 of FIG. 1, in accordance with the exemplary embodiments.

FIG. 6 depicts a block diagram of devices used within the speech decomposition system 100 of FIG. 1, in accordance with the exemplary embodiments. It should be appreciated that FIG. 6 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
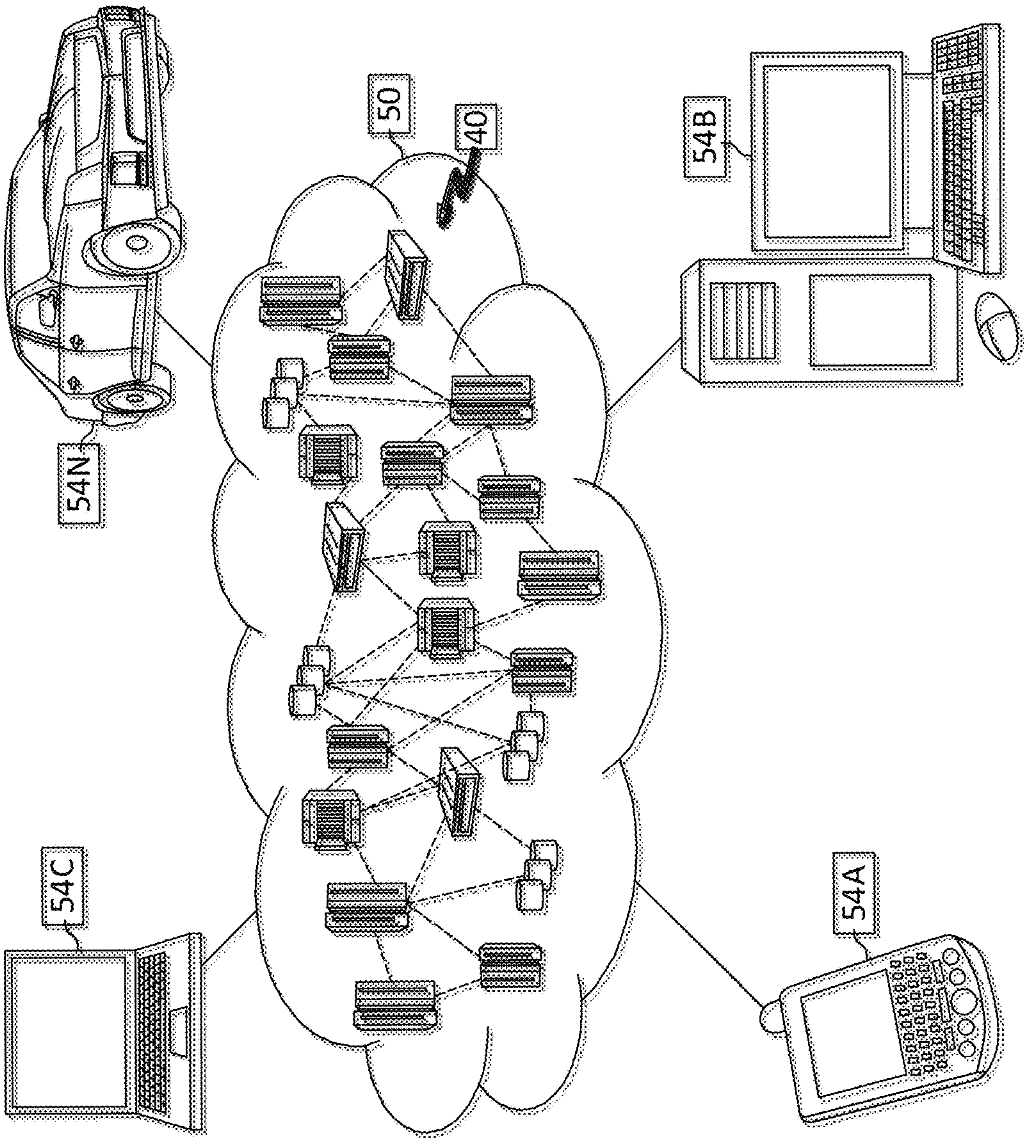
FIG. 7 depicts a cloud computing environment, in accordance with the exemplary embodiments.

Referring now to FIG. 7, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 8:
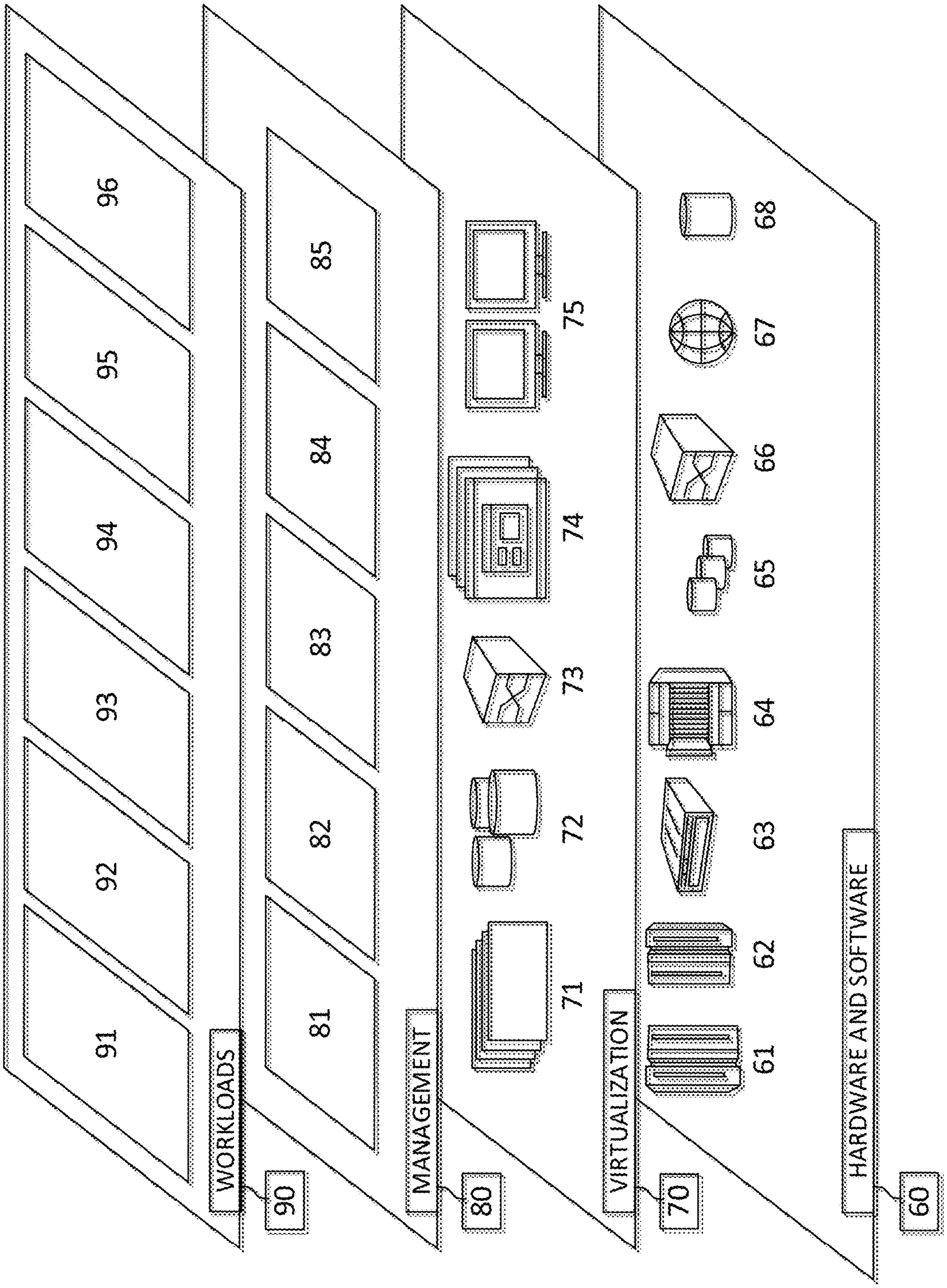
FIG. 8 depicts abstraction model layers, in accordance with the exemplary embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and speech decomposition processing 96.

The exemplary embodiments may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A system for decomposing speech, the system comprising:

a processor that executes computer-executable components stored in a memory, the computer-executable components comprising:

one or more encoders for generating one or more encodings of a speech input comprising rhythm information, pitch information, timbre information, and content information, wherein the rhythm information characterizes a speed a speaker utters a syllable, wherein the pitch information reflects an identity information of the speaker, and wherein the timbre information perceives a voice characteristics of the speaker; and a decoder for decoding the one or more encodings, wherein the decoder converts the one or more encodings to a speech waveform using a neural network.

2. The system of claim 1, wherein the one or more encoders include at least one of a content encoder, a rhythm encoder, and a pitch encoder.

3. The system of claim 2, wherein the content encoder and the rhythm encoder is input the input speech while the pitch encoder is input a pitch contour corresponding to the speech input.

4. The system of claim 2, further comprising:

the content encoder performing a random resampling operation that outputs the content information, the pitch information, the timbre information, and a portion of the rhythm information; and the pitch encoder performing the random resampling operation that outputs the pitch information and the portion of the rhythm information.

5. The system of claim 4, further comprising and based on one or more information bottlenecks implemented within the one or more encoders:

the content encoder encoding the content information;

the rhythm encoder encoding the rhythm information; and the pitch encoder encoding the pitch information.

6. The system of claim 5, further comprising:

the decoder generating the speech input based on the rhythm encodings, the content encodings, the pitch encodings, and a speaker identity label that includes the timbre information.

7. The system of claim 4, wherein the random resampling operation comprises:

dividing the speech input into segments of random lengths; and randomly stretching and squeezing the segments along the time dimension.

8. A computer-implemented method for decomposing speech, the method comprising:

generating one or more encodings of a speech input comprising rhythm information, pitch information, timbre information, and content information, wherein the rhythm information characterizes a speed a speaker utters a syllable, wherein the pitch information reflects an identity information of the speaker, and wherein the timbre information perceives a voice characteristics of the speaker; and decoding the one or more encodings, wherein the decoder converts the one or more encodings to a speech waveform using a neural network.

9. The method of claim 8, wherein the one or more encoders include at least one of a content encoder, a rhythm encoder, and a pitch encoder.

10. The method of claim 9, wherein the content encoder and the rhythm encoder is input the input speech while the pitch encoder is input a pitch contour corresponding to the speech input.

11. The method of claim 9, further comprising:

the content encoder performing a random resampling operation that outputs the content information, the pitch information, the timbre information, and a portion of the rhythm information; and the pitch encoder performing the random resampling operation that outputs the pitch information and the portion of the rhythm information.

12. The method of claim 11, further comprising and based on one or more information bottlenecks implemented within the one or more encoders:

the content encoder encoding the content information;

the rhythm encoder encoding the rhythm information; and the pitch encoder encoding the pitch information.

13. The method of claim 12, further comprising:

the decoder generating the speech input based on the rhythm encodings, the content encodings, the pitch encodings, and a speaker identity label that includes the timbre information.

14. The method of claim 11, wherein the random resampling operation comprises:

dividing the speech input into segments of random lengths; and randomly stretching and squeezing the segments along the time dimension.

15. A computer program product for decomposing speech, the computer program product comprising:

one or more non-transitory computer-readable storage media and program instructions stored on the one or more non-transitory computer-readable storage media capable of performing a method, the method comprising:

generating one or more encodings of a speech input comprising rhythm information, pitch information, timbre information, and content information, wherein the rhythm information characterizes a speed a speaker utters a syllable, wherein the pitch information reflects an identity information of the speaker, and wherein the timbre information perceives a voice characteristics of the speaker; and decoding the one or more encodings, wherein the decoder converts the one or more encodings to a speech waveform using a neural network.

16. The computer program product of claim 15, wherein the one or more encoders include at least one of a content encoder, a rhythm encoder, and a pitch encoder.

17. The computer program product of claim 16, wherein the content encoder and the rhythm encoder is input the input speech while the pitch encoder is input a pitch contour corresponding to the speech input.

18. The computer program product of claim 16, further comprising:

the content encoder performing a random resampling operation that outputs the content information, the pitch information, the timbre information, and a portion of the rhythm information; and the pitch encoder performing the random resampling operation that outputs the pitch information and the portion of the rhythm information.

19. The computer program product of claim 18, further comprising and based on one or more information bottlenecks implemented within the one or more encoders:

the content encoder encoding the content information;

the rhythm encoder encoding the rhythm information; and the pitch encoder encoding the pitch information.

20. The computer program product of claim 19, further comprising:

the decoder generating the speech input based on the rhythm encodings, the content encodings, the pitch encodings, and a speaker identity label that includes the timbre information.

* * * * *